United States Patent
Tsukamoto et al.

(10) Patent No.: US 8,697,294 B1
(45) Date of Patent: Apr. 15, 2014

(54) BATTERY HAVING CERAMIC ELECTROLYTE

(75) Inventors: Hisashi Tsukamoto, Santa Clarita, CA (US); Ryo Tamaki, Valencia, CA (US); Mikito Nagata, Saugus, CA (US); Hiroshi Nakahara, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1221 days.

(21) Appl. No.: 12/231,801

(22) Filed: Sep. 4, 2008

Related U.S. Application Data

(60) Provisional application No. 60/967,922, filed on Sep. 6, 2007, provisional application No. 60/999,382, filed on Oct. 17, 2007.

(51) Int. Cl.
*H01M 10/36* (2010.01)

(52) U.S. Cl.
USPC ............... 429/332; 429/231.4; 429/231.5

(58) Field of Classification Search
USPC ............... 429/332, 521, 231.4, 231.5
See application file for complete search history.

(56) References Cited

U.S. PATENT DOCUMENTS

| | | | | |
|---|---|---|---|---|
| 5,028,500 | A | * | 7/1991 | Fong et al. .................... 429/224 |
| 6,153,333 | A | * | 11/2000 | Barker ........................ 429/218.1 |
| 2003/0049443 | A1 | * | 3/2003 | Nishimura et al. ........... 428/364 |
| 2003/0224244 | A1 | * | 12/2003 | Inda et al. ..................... 429/126 |
| 2007/0087269 | A1 | * | 4/2007 | Inda .............................. 429/322 |

* cited by examiner

*Primary Examiner* — Patrick Ryan
*Assistant Examiner* — Ladan Mohaddes
(74) *Attorney, Agent, or Firm* — Gavrilovich, Dodd & Lindsey, LLP

(57) ABSTRACT

The battery includes a solid electrolyte activating a positive electrode and a negative electrode. The electrolyte is a solid including a lithium ion conductive glass-ceramic. The negative electrode includes a buffer layer between a negative medium and the electrolyte. The negative medium includes one or more primary negative active materials. The buffer layer includes one or more secondary negative active materials that do not dissolve the lithium ion conductive glass-ceramic. The secondary negative active materials can have a redox potential greater than 0.5 V vs Li/Li+.

21 Claims, 2 Drawing Sheets

BATTERY HAVING CERAMIC ELECTROLYTE

REFERENCE TO RELATED APPLICATIONS

This application claims the priority to U.S. Provisional Patent application Ser. No. 60/967,922, filed on Sep. 6, 2007, entitled "Battery Having Ceramic Electrolyte;" and also claims priority to U.S. Provisional Patent application Ser. No. 60/999,382, filed on Oct. 17, 2007, entitled "Battery Having Ceramic Electrolyte," each of which is incorporated herein in its entirety.

FIELD

The present invention relates to electrochemical devices, and more particularly to electrochemical devices having an electrolyte that includes a lithium ion conductive glass-ceramic.

BACKGROUND

Lithium ion batteries are limited by low energy density combined with a high degree of volatility. For these reasons, there is a need for an improved lithium ion battery.

SUMMARY

The battery includes a solid electrolyte activating a positive electrode and a negative electrode. The electrolyte is a solid including a lithium ion conductive glass-ceramic. The negative electrode includes a buffer layer between a negative medium and the electrolyte. The negative medium includes one or more primary negative active materials. The buffer layer includes one or more secondary negative active materials that do not cause a decomposition reaction with the lithium ion conductive glass-ceramic. For instance, one or more secondary negative active materials can have a redox potential that exceeds the redox potential of the lithium ion conductive glass-ceramic. In some instances, the secondary negative active materials has a redox potential greater than 0.5 V vs Li/Li$^+$ or greater than 0.8 V vs Li/Li$^+$. In some instances, the secondary negative active materials include lithium titanium oxides.

In some instances, the lithium ion conductive glass-ceramic has a predominant crystal phase represented by $Li_{1+x}M_x(Ge_{1-y}Ti_y)_{2-x}(PO_4)_3$ or $Li_{1+x'+y'}M'_{y'}Ti_{2-y'}Si_{x'}P_{3-x'}O_{12}$, wherein $0<x\leq 0.8$, $0\leq y\leq 1.0$, $0\leq x'\leq 1.0$, $0\leq y'\leq 1.0$, M represents one or more elements in the group consisting of In, Fe, Cr, Sc, Y, La, Ce, Pr, Nd, Sm, Eu, Gd, Tb, Dy, H, Er, Tm, Yb, Lu, Al, and Ga, and M' represents one or more elements in the group consisting of In, Fe, Cr, Sc, Y, La, Ce, Pr, Nd, Sm, Eu, Gd, Tb, Dy, H, Er, Tm, Yb, Lu, Al, and Ga.

The negative medium can include or consist of a mat of meso-carbon fibers constructed such that the meso-carbon fibers serve as the primary negative active materials. The positive electrode can include a positive active medium on a positive current collector. The positive medium can include one or more halo-lithium transition metal oxides as positive active materials. In some instances, the positive medium includes $Li_{1.2}Ni_{0.175}Cu_{0.1}Mn_{0.53}O_{1.95}F_{0.05}$ as a positive active material.

DESCRIPTION

Figure 1:
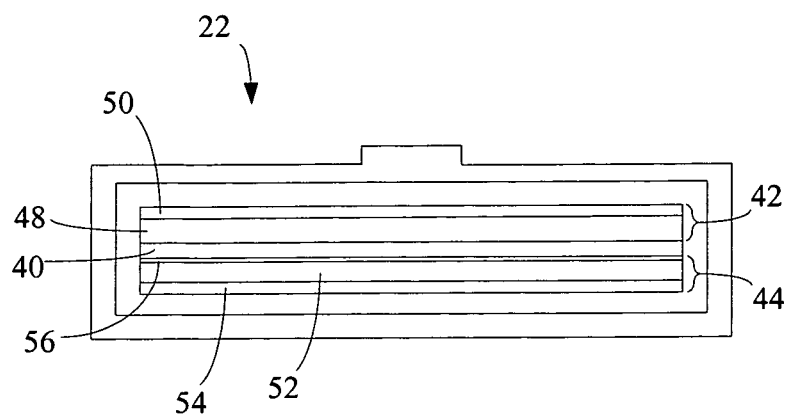
FIG. 1 illustrates a battery having an electrode assembly in a case.

The battery can be a lithium ion battery that includes an electrode assembly in a case. The electrode assembly includes an electrolyte activating one or more positive electrodes and one or more negative electrodes. The electrolyte can include or consist of a solid lithium ion glass ceramic. The non-flammable nature of the ceramic electrolyte can result in a non-volatile battery. However, these lithium ion glass ceramics have not been readily adopted for use in lithium ion batteries because they are readily reduced and decomposed when exposed to conventional negative active materials such as lithium metal, lithiated carbon, and lithium alloys such as Li—Al and Li—Si. As a result, the battery includes a buffer layer between a negative medium and the lithium ion glass ceramic. The negative medium includes one or more negative active materials that can be conventional negative active materials. The buffer layer includes one or more secondary negative active materials that are selected not to reduce the lithium ion glass ceramics. For instance, at least one of the one or more secondary negative active materials can have a redox potential that is greater than the reduction potential of at least one lithium ion conductive glass-ceramic in the electrolyte with lithium or greater than the reduction potential of each lithium ion conductive glass-ceramic in the electrolyte by lithium. In some instances, each of the one or more secondary negative active materials has a redox potential that is greater than the reduction potential of at least one lithium ion conductive glass-ceramic in the electrolyte by lithium or greater than the reduction potential of each lithium ion conductive glass-ceramic in the electrolyte by lithium. For instance, the buffer layer can include $Li_4Ti_5O_{12}$ (LTO) as a secondary negative active material. LTO does not reduce the lithium ion glass ceramic. Without being bound to theory, this is believed to be a result of the elevated redox potential of LTO relative to the reduction potential of lithium ion glass ceramics. For instance, $Li_4Ti_5O_{12}$ (LTO) has a 1.5 V redox potential vs Li/Li$^+$. As a result, the battery can have an electrolyte with reduced volatility while also retaining the advantages of traditional negative active materials.

The lithium ion glass ceramic can operate as a separator. Accordingly, the battery can exclude a separator which can reduce the size and weight of the battery. Additionally, the use of a non-volatile electrolyte allows the battery to exclude safety valves and/or current interruption devices (CIDs).

The case can include or consist of moisture blocking plastics such as an epoxy or such as an epoxy composite having an inorganic filler dispersed in the epoxy. For instance, one or more parts of the case can consist of plastic. Additionally or alternately, the electrode assembly can be encapsulated in the plastic. Plastics have not been adopted as battery case materials because the organic solvents in the electrolytes of conventional lithium ion batteries dissolved them. Since the lithium ion glass ceramic does not dissolve the plastics such as epoxies and epoxy composites, these materials are a suitable material for the battery case. The use of these plastics can reduce the weight of the battery case.

In some instances, the negative medium can serve as a negative current collector. For instance, the negative medium can be a mat of carbon fibers or meso-carbon fibers that serve as the negative medium. Because the mat of fibers is highly conductive, the mat can also serve as a negative current collector. As a result, the negative electrode can exclude a negative current collector.

In view of the above, the battery can exclude any one of the components, any combination of the components, or all of the components selected from a group consisting of the separator, a liquid electrolyte, a case having one or more layers that include metal or consist of metal, a negative current collector, a gasket, a pressure release valve, and a current interruption device (CID). Elimination of these components from the battery can decrease the weight of the battery and accordingly increase the weight based energy density of the battery (gravimetric energy density of the battery). The selection of positive active materials in the positive electrode can also enhance the gravimetric energy density. For instance, conventional positive active materials such as $LiCoO_2$ mixtures have an energy on the order of 120 mAhr/g at 4 V versus vs Li/Li+. However, in conjunction with the lithium ion glass ceramic, the battery can employ a halo-lithium transition metal oxides such as $Li_{1.2}Ni_{0.175}Co_{0.1}Mn_{0.53}O_{1.95}F_{0.05}$ as a positive active material. These positive active materials can provide an energy on the order of 280 mAhr/g at 5 V versus vs Li/Li+. The combination of higher voltage and higher energy density can further increase the gravimetric energy density of the battery. For instance, a lithium ion battery with a gravimetric energy density higher than 580 w-hr/kg of battery weight can be achieved or a lithium ion battery with a gravimetric energy density higher than 600 w-hr/kg of battery weight. In some instances, these gravimetric energy densities can be achieved in a battery having a size less than 25 A-hr or less than 21 A-hr.

FIG. 1 illustrates a battery. The battery 22 includes an electrode assembly having a solid electrolyte 40 activating a positive electrode 42 and a negative electrode 44. The positive electrode 42 includes a positive medium 48 and a positive current collector 50. The negative electrode 44 includes a negative medium 52 and a negative current collector 54. A buffer layer 56 is between the electrolyte 40 and the negative medium 52. The buffer layer 56 can be included in the negative electrode 44 or can be included in the electrolyte 40. The positive electrode and the negative electrode are positioned in a case. A positive terminal (not shown) is in electrical communication with the positive current collector and the case includes a negative terminal (not shown) in electrical communication with the negative medium.

In some instances, the battery excludes a negative current collector. For instance, FIG. 2 illustrates an embodiment of the battery where the negative electrode excludes a negative current collector.

The battery case can include a tube and a cover (or cap). The tube can have an open end and a closed end and the cover can close the open end. The tube can have two open ends and each cover can be used to close one of the open ends. Alternately, the case can include a tube with two closed ends and can exclude caps and covers. The length of the tub can be shorter than the width or diameter of the tube. The tube can have a round, oval, or square cross section. When the case includes a tube, the electrode assembly is positioned in an interior of the tube such that the tube surrounds the electrode assembly. Other case constructions are possible.

The case for the battery can include or consist of one or more layers of an epoxy. For instance, the case can include a tube constructed of epoxy and one or more covers constructed of epoxy. Epoxies have not been adopted as battery case materials because they were dissolved by the organic solvents in the electrolytes of conventional lithium ion batteries. However, since a lithium ion conductive glass-ceramic can be compatible with epoxies, the case can include or consist of epoxies. For instances, the epoxy can be exposed to the electrolyte and/or contact the electrolyte. Additionally, the epoxy can be on the outside of the case. As a result, the epoxy can form the entire thickness of the case wall. Accordingly, all or a portion of the case can exclude layers of metal. For instance, the case can include one or more covers that each exclude metal and/or the case can include a tube that excludes metal.

Figure 2:
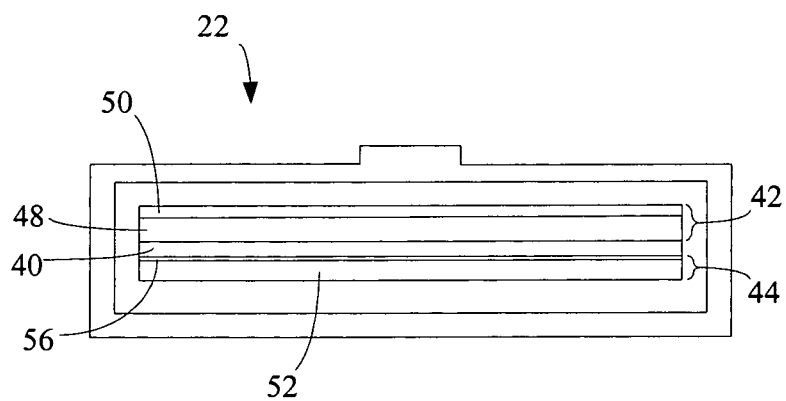
FIG. 2 illustrates a battery having an electrode assembly in a case. The electrode assembly includes a negative electrode that excludes a negative current collector.
Figure 3:
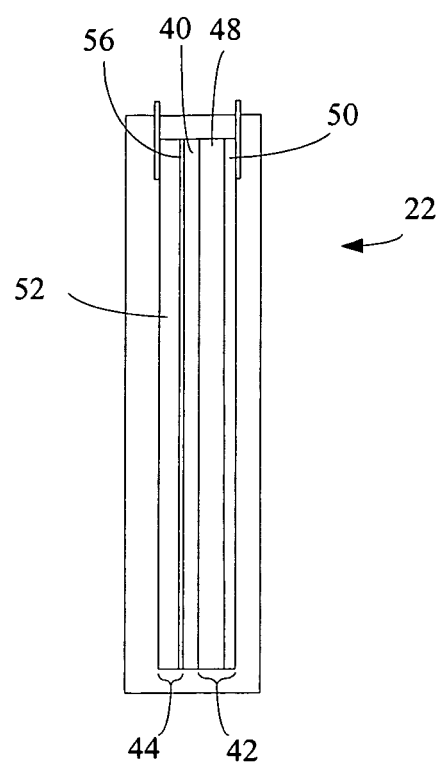
FIG. 3 illustrates a battery having a plastic serving as a case for an electrode assembly constructed according to FIG. 1 or FIG. 2.

FIG. 3 shows an epoxy serving as a case for an electrode assembly constructed according to FIG. 2. The electrode assembly is encapsulated in the epoxy. In some instances, the electrode assembly is encapsulated in the epoxy such that the epoxy contacts at least a positive electrode and a negative electrode. Accordingly, the epoxy serves as a tube and as the covers of the battery case. A positive terminal 60 extends through the case and is in electrical communication with the positive current collector. The positive terminal can be a pin, a tab, or other electrical conductor. A negative terminal 62 positive terminal 60 extends through the case and is in electrical communication with the negative medium 52. Although FIG. 3 shows the negative terminal 62 connected to a surface of the negative medium, the negative terminal can be embedded in the negative medium. The negative terminal can be a pin, tab, or other electrical conductor. In some instances, the positive terminal and the negative terminal are each a tab in order to reduce the weight of the battery and accordingly increase energy density. Although a portion of the positive terminal and the negative terminal are shown extend outside of the case, the positive terminal and/or the negative terminal can be flush with the case in order to reduce the weight of the battery and accordingly increase energy density.

Although FIG. 3 illustrates an epoxy serving as a case for the electrode assembly of FIG. 2, the epoxy case can be employed in conjunction with the electrode assembly of FIG. 1. In this instance, the negative terminal 62 can be in electrical communication with the negative current collector.

Although FIG. 1 through FIG. 3 illustrate the battery as including one negative electrode and one positive electrode, the battery can include more than one negative electrode and/or more than one positive electrode with the negative electrodes and positive electrodes each separated by a layer of the electrolyte. Additionally, the battery can have a variety of different configurations such as stacked configuration, a "jellyroll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

An epoxy that serves as the case can be an electrically insulating epoxy. In some instances, the epoxy is also moisture blocking. Suitable epoxies include epoxies having an organic backbone such as a backbone having repeating units that each includes a bisphenol moiety. Examples of suitable epoxies with a backbone having repeating units that each include a bisphenol moiety are commercially available from Dow Chemical Company with a trade name "D.E.R." In some instances, the Formula I represents an example of an epoxy with a backbone having repeating units that each include or consist of a bisphenol moiety.

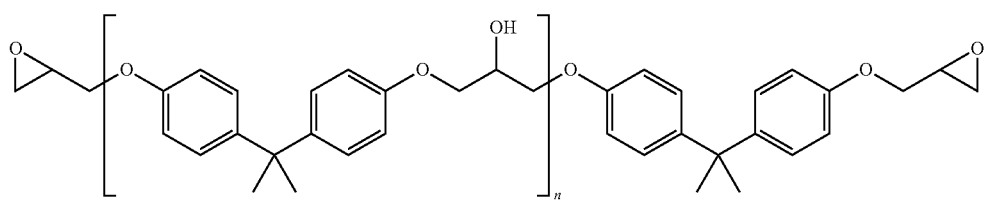

Formula I where n ranges from 0 to 25 or from 1 to 25. Another suitable epoxy is epoxy novolac resin, which is liquid reaction product of epichlorohydrin and phenol-formaldehyde novolac. This type of epoxy is commercially available from Dow Chemical Company with a trade name "D.E.N." In some instances, these epoxies are cured by mixing the monomer with a catalyst or hardener, which are typically made of amine compounds. These amines include primary amines, secondary amines, or tertially amines that include organic groups attached. Suitable organic groups for inclusion in the amines include aliphatic groups, cycloaliphatic groups and aromatic groups. The number of amines per molecule ranges from 1 to 100. In some instances, inorganic fillers such as silica or alumina, or more preferably clay is combined into an epoxy resin in 0.1 to 20 wt % of the total weight of the resin to increase the moisture blocking capabilities of the epoxy.

Other suitable epoxies have polysiloxane or oligosiloxane backbones. In some instances, the polysiloxane or oligosiloxane backbones are cross-linked. An advantage of polysiloxanes and oligosiloxanes are high flame retardant property. The silicons in the backbone of the polysiloxane or oligosiloxanes are linked to a first substituent selected from a group consisting of a hydrogen, an alkyl group, a hydroxyl group, an alkoxy group, and a cross-link and are also linked to a second substituent selected from a group consisting of a hydrogen, a hydroxyl group, an alkyl group, an alkoxy group, and a cross-link. The cross link can be an oxygen, a poly(alkylene oxide), a polysiloxane or an oligosiloxane. Formula II represents an example of a suitable oligosiloxane that includes a cross-link as the first substituent. The cross-link in Formula II is an oxygen.

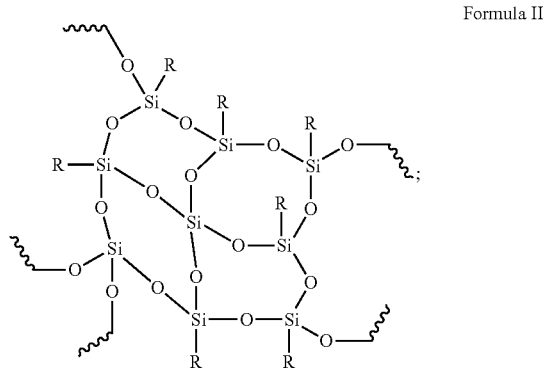

Formula II wherein R represents the second substituent and the oligosiloxane backbones are terminated with alkoxy groups.

The electrolyte is a solid electrolyte that includes or consists of a lithium ion conductive glass-ceramic. Examples of the lithium ion conductive glass-ceramic have a predominant crystal phase represented by $Li_{1+x}M_x(Ge_{1-y}Ti_y)_{2-x}(PO_4)_3$ or $Li_{1+x'+y'}M'_{y'}Ti_{2-y'}Si_xP_{3-x}O_{12}$, wherein: $0<x\leq0.8$; $0\leq y\leq1.0$; $0\leq x'\leq1.0$; $0\leq y'\leq1.0$; M represents one or more elements in the group consisting of In, Fe, Cr, Sc, Y, La, Ce, Pr, Nd, Sm, Eu, Gd, Th, Dy, H, Er, Tm, Yb, Lu, Al, Ga; M' represents one or more elements in the group consisting of In, Fe, Cr, Sc, Y, La, Ce, Pr, Nd, Sm, Eu, Gd, Th, Dy, H, Er, Tm, Yb, Lu, Al, Ga.

In some instances, $0<x'\leq0.6$; $0<y'\leq0.4$. Additionally or alternately, in some instances, M represents Al and/or Ga and/or M' represents Al and/or Ga. In one example, the lithium ion conductive glass-ceramic has a predominant crystal phase represented by $Li_{1+1}M_x(Ge_{1-y}Ti_y)_{2-x}(PO_4)_3$ wherein: $0<x\leq0.8$; y=1; and M represents Al or Ga. In one example, the lithium ion conductive glass-ceramic has a predominant crystal phase represented by $Li_{1+x'+y'}M'_{y'}Ti_{2-y'}Si_xP_{3-x}O_{12}$ wherein: $0<x\leq0.8$; y=0; and M represents Al or Ga. In some instances, the lithium ion conductive glass-ceramic is more than 95 wt % of the total electrolyte weight, or more than 98 wt %.

The above lithium ion conductive glass-ceramics can be generated by generating a mixture having the compounds listed in table 1 at the listed molar percentages. In Table 1, M" represents one or more elements selected from a group consisting of In, Fe, Cr, Sc, Y, La, Ce, Pr, Nd, Sm, Eu, Gd, Th, Dy, H, Er, Tm, Yb, and Lu. The mixture can be heated to a temperature where the compounds melt and then cast onto a preheated surface for cooling into a sheet of the electrolyte. In some instances, a preliminary mixture is created. The preliminary mixture can include one or more preliminary compounds that break down into one or more compounds in table 1 upon heating. In some instances, the preliminary mixture gives off gasses such as $CO_2$, $NH_3$ and $H_2$ upon breakdown of the preliminary compound. Examples of preliminary compound includes $Li_2CO_3$, which can break down into $CO_2$ and $Li_2O$. Another example of a preliminary compound includes $NH_6PO_4$, which can break down into $NH_3$, $H_2O$, $P_2O_5$ and $Li_2O$. Another example of a preliminary compound includes $Al(OH)_3$, which can break down into $H_2O$ and $Al_2O_3$. When a preliminary mixture that includes the preliminary compounds in employed, the preliminary mixture can be heated to a temperature where the gasses from the one or more preliminary compounds evaporated and the compounds in Table 1 remain in the mixture. The mixture can then be heated to the temperature where the compounds melt. In one example, the temperature at which the gasses are evaporated is on the order of 700° C. and the temperature to which the mixture is heated is on the order of 1350° C. The mixture or the preliminary mixture can be mixed with a binder to form an electrolyte paste. Suitable binders for inclusion in the electrolyte paste include, but are not limited to, silicate compounds, PVDF, CMC and SBR.

TABLE 1

| Compound in mixture. | Molar percentage. |
|---|---|
| $P_2O_5$ | 30-45 |
| $SiO_2$ | 0-15 |
| $GeO_2 + TiO_2$ | 25-50 |

TABLE 1-continued

| Compound in mixture. | Molar percentage. |
|---|---|
| $GeO_2$ | 0-50 |
| $TiO_2$ | 0-50 |
| $ZrO_2$ | 0-8 |
| $M_2O_3$ | 0 ≤ 10 |
| $Al_2O_3$ | 0-12 |
| $Ga_2O_3$ | 0-12 |
| $Li_2O$ | 10-25 |

Suitable positive current collectors 50 include, but are not limited to, aluminum, stainless steel, titanium, or nickel substrates. The positive current collector can be a foil.

The positive medium 48 includes or consists of one or more positive active materials. Suitable positive active materials include, but are not limited to, lithium transition metal oxides that also include one or more halogens (halo-lithium transition metal oxide). Suitable halo-lithium transition metal oxides include one or more transition metals included in a group consisting of Mn, Ni, Co, Fe, Cr, Cu. In one example, the halo-lithium transition metal oxides include Mn, Ni, Co and excludes other transition metals. The halogen in the halo-lithium transition metal oxides can include or consist of fluorine. For instance, a suitable halo-lithium transition metal can include fluorine can exclude other halogens or can include one or more other halogens.

In one example, the halo-lithium transition metal oxide includes one or more transition metals included in a group consisting of Mn, Ni, Co, Fe, Cr, and Cu and also includes fluorine and one or more other halogens. In another example, the halo-lithium transition metal oxide includes one or more transition metals included in a group consisting of Mn, Ni, and Co and also includes fluorine and one or more other halogens. In one example, the halo-lithium transition metal oxide includes one or more transition metals included in a group consisting of Mn, Ni, Co, Fe, Cr, and Cu and also includes fluorine and excludes one or more other halogens. In another example, the halo-lithium transition metal oxide includes one or more transition metals included in a group consisting of Mn, Ni, and Co and also includes fluorine and excludes one or more other halogens. The elements in the halo-lithium transition metal oxide can be arranged in a Co—Mn—Ni oxide matrix structure.

A molar ration of lithium: halogen in the halo-lithium transition metal oxide can be less than 50:1, or 30:1 and/or greater than 5:1, or 20:1. Additionally or alternately, a molar ratio of the total transition metals:halogen can be in less than 30:1, or 20:1 and/or greater than 2:1 or 10:1. For instance, an example of the halo-lithium transition metal oxide is $Li_{1.2}Ni_{0.2}Co_{0.1}Mn_{0.5}O_2F_{0.1}$ or $Li_{1.2}Ni_{0.175}Co_{0.1}Mn_{0.53}O_{1.95}F_{0.05}$.

The positive medium 48 can optionally include binders, conductors and/or diluents such as PVDF, graphite and acetylene black in addition to the one or more positive active materials. Suitable binders include, but are not limited to, PVDF, powdered fluoropolymer, powdered polytetrafluoroethylene or powdered PVDF. Suitable conductors and/or diluents include, but are not limited to, acetylene black, carbon black and/or graphite or metallic powders such as powdered nickel, aluminum, titanium and stainless steel. In some instances, the binders, conductors and/or diluents are present at less than 5 wt %, 10 wt % or 20 wt % of the total weight of the positive medium.

In some cases, the positive electrode can be generated by forming a slurry that includes the components of the positive medium and a solvent. The slurry is coated on one side the positive current collector or on both sides of the positive current collector. The solvent can then be evaporated from the slurry so as to leave the positive medium on the current collector. The positive electrode can be cut out of the result. In other cases, the positive metal collector is deposited by vapor deposition technologies on the positive electrode.

When the negative electrode includes a negative current collector, a suitable material for the negative current collector 54 includes, but is not limited to, lithium metal, titanium, a titanium alloy, stainless steel, nickel, copper, tungsten, tantalum, and alloys thereof.

The negative medium 52 includes or consists of one or more negative active materials. The negative active materials can include or consist of one or more forms of carbon. For instance, the negative active medium can include a carbonaceous mixture. The carbonaceous mixture can include or consist of one, two or three components selected from the group consisting of: carbon beads, carbon fibers, and graphite flakes. Additional descriptions of the carbon beads, carbon fibers, and graphite flakes can be found in U.S. patent application Ser. No. 10/264,870, filed on Oct. 3, 2002, entitled "Negative Electrode for a Nonaqueous Battery," and incorporated herein in its entirety, which claims priority to U.S. Provisional Patent Application Ser. No. 60/406,846, filed on Aug. 29, 2002, and entitled "Negative Electrode for a Nonaqueous Battery," and incorporated herein in its entirety. U.S. patent application Ser. No. 10/264,870 and U.S. Provisional Patent Application Ser. No. 60/406,846 also provide descriptions of negative electrode constructions that can be employed in the battery.

In some instances, the negative active material includes or consists of lithium metal. The lithium metal can serve as the negative medium. In some instances where lithium metal serves as the negative medium, the negative electrode can exclude a negative current collector. The negative active material can also include or consist of a lithium alloy such as Li—Al and Li—Si. The alloy of lithium metal can serve as the negative medium. In some instances where alloy of lithium metal serves as the negative medium, the negative electrode can exclude a negative current collector.

In some instances, the negative active material or the negative medium includes or consists of carbon fibers. In some instances, the carbon fibers have a specific surface area of less than 2 $m^2/g$ or 2 $m^2/g$; an average diameter of less than 150 µm or less than 300 µm and/or in a range of 5 µm to 300 µm or 5 µm to 150 µm; a d002 (layer distance) of less than 3.528 Å or 3.395; and an Lc of greater than 10 nm or 60 nm. The fibers can include or consist of meso-carbon fibers. Meso-carbon fibers may be prepared by flowing mesophase carbon pitch liquid in the shear-stressed field of a spinneret to align the disk-like molecules in the pitch and by oxidation thermosetting to stabilize the shape and microstructure of the fiber before the carbonization and the graphitization. The carbon fibers can be hot pressed into a mat that can serve as the negative active material. The mat can have a density greater than 1.4 $g/cm^3$ or 0.6 $g/cm^3$ or 0.4 $g/cm^3$ and/or less than 1.7 $g/cm^3$ or 10 $g/cm^3$. Since the meso-carbon fibers can also be a highly conductive, a mat of meso-carbon fibers can serve as both the negative active material and as the negative current collector. As a result, in some instances, the battery excludes a negative current collector. Accordingly, in some instances, the mat of carbon fibers serves as the negative electrode or the negative electrode consists of the mat of carbon fibers.

The buffer layer 56 is positioned between the electrolyte 40 and the negative medium 54. in some instances, the buffer layer contacts both the negative medium 54 and the electrolyte 40. The buffer layer can be positioned such that no portion of the negative medium 54 contacts the electrolyte 40 or such that no portion of the lithium ion glass ceramic in the electrolyte contacts the negative medium 54. As noted above, the electrolyte includes or consists of a lithium ion glass ceramic. These materials have not been adopted in lithium on batteries because they are readily reduced and decomposed when exposed to traditional negative active materials such as lithiated carbon, lithium metal, $LiC_6$, and lithium alloys such as Li—Al and Li—Si. The buffer layer reduces or prevents the reduction of the lithium ion glass ceramic.

The buffer layer can include or consist of one or more secondary negative active materials. In one example, the one or more secondary negative active materials include or consist of a ceramic that does not reduce the lithium ion glass ceramic. In some instances, the one or more secondary negative active materials include or consist of a ceramic that includes or consists of lithium, titanium, and oxygen. An example of a suitable ceramic compound that includes or consists of lithium, titanium, and oxygen is represented by $Li_4Ti_5O_{12}$ (LTO). LTO does not reduce the lithium ion glass ceramic. Without being bound to theory, this is believed to be a result of the elevated redox potential of LTO. For instance, $Li_4Ti_5O_{12}$ (LTO) has a 1.5 V redox potential vs $Li/Li^+$. Accordingly, suitable secondary negative active materials include or consist of ceramics or non-ceramics having a redox potential of greater than 0.5 volts vs $Li/Li^+$, or greater than 0.8 volts vs $Li/Li^+$, or greater than 1.4 volts vs $Li/Li^+$.

At least one of the one or more secondary negative active materials can have a redox potential that is greater than the redox potential of at least one lithium ion conductive glass-ceramic in the electrolyte or greater than the redox potential of each lithium ion conductive glass-ceramic in the electrolyte. In some instances, each of the one or more secondary negative active materials has a redox potential that is greater than the redox potential of at least one lithium ion conductive glass-ceramic in the electrolyte or greater than the redox potential of each lithium ion conductive glass-ceramic in the electrolyte. Additionally, the battery can be constructed to have only one or both conditions selected from a group consisting of a first condition and a second condition. In the first condition, at least one of the one or more secondary negative active materials has a redox potential that is greater than the redox potential of at least one of the primary negative active materials or greater than the redox potential of each of the primary negative active materials. Additionally or alternately, in the first condition, each of the one or more secondary negative active materials has a redox potential that is greater than the redox potential of at least one of the primary negative active materials or greater than the redox potential of each of the primary negative active materials. In the second condition, at least one of the one or more positive active materials has a redox potential that is greater than the redox potential of at least one of the secondary negative active materials or greater than the redox potential of each of the secondary negative active materials. Additionally or alternately, in the second condition each of the one or more positive active materials has a redox potential that is greater than the redox potential of at least one of the secondary negative active materials or greater than the redox potential of each of the secondary negative active materials. The battery is preferably constructed to have both the first condition and the second condition. The redox potentials can all be vs $Li/Li^+$.

The buffer layer can include particles that include the ceramic, consist of the ceramic, or consist essentially of the ceramic. The particles can have an average diameter greater than 1 nanometers, or greater than 10 nanometers and/or less than 100 nanometers, or less than 1000 nanometers. Particles having an average diameter in a range of 1 nanometer to 100 nanometers can provide uniform coverage of the lithium conductive ion glass and/or the carbon fiber sheet.

The total weight of the ceramic compounds that serve as the secondary active materials can be more than 50 wt % of the total weight of the one or more secondary negative active materials included in the buffer layer or more than 95 wt % of the total weight of the one or more secondary negative active materials included in the buffer layer.

In some instances, the buffer layer includes a binder. Suitable binders for use with the buffer layer include, but are not limited to, PVdF, carboxymethyl cellulose (CMC), styrene butadiene rubber (SBR), and combinations thereof. In some instances, the one or more binders are present at less than 2 to about 10 wt % of the total weight of the buffer layer.

The buffer layer can include one or more conductors. Suitable conductors include, but are not limited to, carbon black and conductive ceramics. In some instances, the conductors include or consist of a conductive ceramic. Examples of conductive ceramics include, but are not limited to, $ReO_3$, $M_xReO_3$, TiO, NbO, $LaTiO_3$, $LaNiO_3$, $LaCuO_3$, $MoO_3$, $SrIrO_3$, $SrCrO_3$, $Pb_2Li_2O_7$, $LiTi_2O_4$, $RuO_2$, $OsO_2$, $IrO_2$, $MoO_2$, $WO_2$, $RhO_2$, $PtO_2$, wherein: $M_x$ is Pb or Cd; and x is greater than or equal to 1 and less than or equal to 2. The conductors are desirable when the buffer layer include secondary active materials associated with an elevated impedance such as LTO. The conductive ceramics are suitable for use with secondary active materials that are ceramics and require high temperature sintering temperature of more than 700° C. or 1000° C.

As noted above, the buffer layer can prevent the reduction of the lithium ion glass ceramic. However, the materials that are suitable for use as secondary negative active materials can have a capacity that is less than a capacity of the one or more active materials in the negative medium. For instance, ceramics that are suitable for use as secondary negative active materials can have a lower capacity than the meso-carbon fibers included in a carbon mat. Accordingly, in some instances, the negative medium is thicker than the buffer layer in order to enhance the capacity of the negative electrode. For instance, the buffer layer can have a thickness less than 0.1 μm, less than 1 μm, or less than 5 μm. The negative medium can have a thickness less than 100 μm, less than 350 μm, or less than 5 μm. A ratio of the thickness of the negative medium to the thickness of the buffer layer can be greater than 1:1, 5:1, 10:1, 100:1 or 1000:1.

The negative electrode can be generated by generating a slurry that includes the components of the buffer layer and a solvent such as 1-methyl-2-pyrrolidinone (NMP). The slurry can be coated onto a layer of the negative medium and dried. The negative electrode can be cut out of the result. For instance, the slurry can be coated on a mat of meso-carbon fibers and the slurry dried so as to provide a sheet having the negative electrode materials. The negative electrode can then be cut out of the result.

A variety of methods can be employed to generate an electrode assembly such as the electrode assembly illustrated in FIG. 1 through FIG. 3. In one example, the electrode assembly can be generated by separately generating the electrolyte, the positive electrode, and the negative electrode and then using heat and pressure to laminate these components.

Tape casting can also be employed to generate the electrode assembly. For instance, a slurry having the components of the negative medium can be coated on one side of the buffer layer or a slurry having the components of the buffer layer can be coated on one side of the negative medium. The slurry can be dried. The electrolyte paste can be coated onto the exposed side of the buffer layer and the electrolyte paste can be dried. A slurry having the components of the positive medium can be coated on the dried electrolyte paste and the slurry dried. The result can be heated so as to form the dense positive, negative buffer and electrolyte layer and to achieve intimate contact at the interfaces. Vapor deposition technologies can be employed to form the positive current collector on the positive medium. When the negative electrode is to include a negative current collector, vapor deposition technologies can be employed to form the negative current collector on the negative medium. The electrode assembly can be cut out of the result. Suitable cutting techniques include laser cutting and die cutting.

The electrode assembly can also be generated by coating a slurry having the components of the buffer layer on a sheet and drying the slurry so as to form the buffer layer. The electrolyte paste can be coated on the buffer layer and dried. A slurry having the components of the positive medium can be coated on the dried electrolyte paste and the slurry dried. The result can be removed from the sheet and a slurry having the components of the negative medium can be coated on the exposed side of the buffer layer and the slurry dried. Vapor deposition technologies can be employed to form the positive current collector on the positive medium. At several different points in the method, the result can be heated so as to form the dense positive, negative buffer and electrolyte layer and to achieve intimate contact at the interfaces. When the negative electrode is to include a negative current collector, vapor deposition technologies can be employed to form the negative current collector on the negative medium. The electrode assembly can be cut out of the result. Suitable cutting techniques include laser cutting and die cutting.

A positive terminal can be attached to the positive current collector using traditional technologies. When the negative electrode includes a negative current collector, the negative terminal can be attached to the positive current collector using traditional technologies. When the negative electrode excludes a negative current collector, the negative terminal can be connected to the buffer layer using a conductive paste such as conductive paste.

A battery according to FIG. 3 can be generated by placing the electrode assembly in a die or mold. An epoxy precursor liquid mixture having precursors for the epoxy and a hardener can be poured into the die or mold until the epoxy precursor liquid is above the top of the electrode assembly and the positive terminal and negative terminal extend through the epoxy precursor liquid. The epoxy precursor liquid can be cured so as to form an epoxy that encapsulates the electrode assembly. In some instances, the positive terminal and/or the negative terminal are trimmed after the liquid is cured.

EXAMPLE 1

0.44 parts of conductive ceramic powder, 80 parts of LTO, 17 parts of NMP and 6.6 parts of polypropylene/polybutadiene copolymer are mixed to produce buffer layer slurry.

0.44 parts of conductive ceramic powder, 80 parts of the positive powder (LNCAO), 17 parts of NMP and 6.6 parts of polypropylene/polybutadiene copolymer are mixed to produce a positive electrode slurry.

80 parts of LIC-GC, 17 parts of NMP and 6.6 parts of polypropylene/polybutadiene copolymer are mixed to produce an electrolyte slurry.

The buffer slurry is coated on a carbon fiber sheet and dried at 80° C. for 20 min and 10 h at 120° C. in vacuum. The electrolyte slurry is coated on the dried buffer layer and dried at 80° C. for 20 min and 10 h at 120° C. in vacuum. The positive slurry is coat on the electrolyte. The multi-layer sheet is heated under argon at 850° C. and the binder removed.

A 200 nm thick aluminum layer is deposited on the positive medium by sputtering technique.

The sintered tri layer sheet is laser cut or die cut.

Silver paste is used to connect a positive terminal to the positive medium and a negative terminal to the negative medium.

The battery cell is dipped in an epoxy resin precursor and cured at 80° C. for 1 h.

The powder density of 598 Wh/kg is obtained with the active area of 1467 $cm^2$ based on the capacity, potentials, and the amount of the active and non-active materials.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A battery, comprising:
a solid electrolyte activating a positive electrode and a negative electrode,
the electrolyte being a solid including a lithium ion conductive glass-ceramic; and
the negative electrode includes a buffer layer between a negative medium and the electrolyte,
the negative medium includes one or more primary negative active materials
the buffer layer including one or more secondary negative active materials with a redox potential that exceeds the redox potential of the lithium ion conductive glass-ceramic.

2. The battery of claim 1, wherein the one or more secondary negative active materials has a redox potential greater than 0.5 V.

3. The battery of claim 1, wherein the lithium ion conductive glass-ceramic has a predominant crystal phase represented by $Li_{1+x}M_x(Ge_{1-y}Ti_y)_{2-x}(PO_4)_3$ or $Li_{1+x'+y'}M'_{y'}Ti_{2-y'}Si_{x'}P_{3-x'}O_{12}$, wherein $0<x\leq0.8$, $0\leq y\leq1.0$, $0\leq x'\leq1.0$, $0\leq y'\leq1.0$, M represents one or more elements in the group consisting of In, Fe, Cr, Sc, Y, La, Ce, Pr, Nd, Sm, Eu, Gd, Th, Dy, H, Er, Tm, Yb, Lu, Al, and Ga, and M' represents one or more elements in the getup consisting of In, Fe, Cr, Sc, Y, La, Ce, Pr, Nd; Sm, Eu, Gd, Th, Dy, H, Er, Tm, Yb, Lu, Al, and Ga.

4. The battery of claim 1, wherein the positive electrode includes a positive medium that includes a halo-lithium transition metal oxides.

5. The battery of claim 4, wherein the halo-lithium transition metal oxide includes Mn, Ni, Co and fluorine.

6. The battery of claim 5, wherein the halo-lithium transition metal oxide is represented by $Li_{1.2}Ni_{0.175}Co_{0.1}Mn_{0.53}O_{1.95}F_{0.05}$.

7. The battery of claim 1, wherein the negative electrode excludes a negative current collector.

8. The battery of claim 7, wherein the negative medium includes a mat of meso-carbon fibers.

9. The battery of claim 1, wherein the negative medium includes a mat of meso-carbon fibers.

10. The battery of claim 1, wherein the battery excludes a separator between the positive electrode and the negative electrode.

11. The battery of claim 1, wherein the battery has a gravimetric energy density higher than 600 w-hr/kg of battery weight and a size less than 21 A-hr.

12. The battery of claim 1, wherein the lithium ion conductive glass-ceramic has a predominant crystal phase represented by $Li_{1+x'+y'}M'_{y'}Ti_{2-y'}Si_xP_{3-x}O_{12}$.

13. The battery of claim 12, wherein $0<x'\leq0.6$ and $0<y'\leq0.4$.

14. The battery of claim 12, wherein M' represents one or more elements selected from a group consisting of Al and Ga.

15. The battery of claim 1, wherein the lithium ion conductive glass-ceramic has a predominant crystal phase represented by $Li_{1+x}M_x(Ge_{1-y}Ti_y)_{2-x}(PO_4)_3$.

16. The battery of claim 15, wherein the $0<x\leq0.8$ and $y=1$.

17. A battery comprising:
   a solid electrolyte activating a positive electrode and a negative electrode, and excluding a separator between the positive electrode and the negative electrode,
      the electrolyte being a solid that includes a lithium ion conductive glass-ceramic with a predominant crystal phase represented by $Li_{1+x}M_x(Ge_{1-y}Ti_y)_{2-x}(PO_4)_3$ or $Li_{1+x'+y'}M'_{y'}Ti_{2-y'}Si_xP_{3-x}O_{12}$, wherein $0<x\leq0.8$, $0\leq y\leq1.0$, $0\leq x'\leq1.0$, $0\leq y'\leq1.0$, M represents one or more elements in the group consisting of In, Fe, Cr, Sc, Y, La, Ce, Pr, Nd, Sm, Eu, Gd, Th, Dy, H, Er, Tm, Yb, Lu, Al, and Ga, and M' represents one or more elements in the group consisting of In, Fe, Cr, Sc, Y, La, Ce, Pr, Nd, Sm, Eu, Gd, Th, Dy, H, Er, Tm, Yb, Lu, Al, and Ga, and
   the negative electrode includes a buffer layer between a negative medium and the electrolyte and the negative electrode excludes a negative current collector,
      the negative medium includes one or more primary negative active materials that consist of carbon,
      the buffer layer including one or more secondary negative active materials that are each a ceramic compound that includes or consists of lithium, titanium, and oxygen, and
      the positive electrode including a positive medium on a positive current collector, the positive medium including a halo-lithium transition metal oxide as a positive active medium.

18. A battery, comprising:
   a solid electrolyte activating a positive electrode and a negative electrode,
      the electrolyte being a solid including a lithium ion conductive glass-ceramic; and
   the negative electrode includes a buffer layer between a negative medium and the electrolyte,
      the negative medium includes one or more primary negative active materials
      the buffer layer including one or more secondary negative active materials, at least one of the secondary negative active materials having a redox potential that is higher than a redox potential of at least one of the one or more primary negative active materials.

19. The battery of claim 1, wherein the positive electrode includes a positive medium that includes one or more positive active materials, at least one of the positive active materials having a redox potential that is higher than a redox potential of at least one of the one or more secondary negative active materials.

20. The battery of claim 1, wherein the buffer layer and the negative medium are distinct layers.

21. The battery of claim 1, wherein the buffer layer has a chemical composition that is different from a chemical composition of the negative medium.

* * * * *